(12) United States Patent
Crozier et al.

(10) Patent No.: US 11,178,999 B2
(45) Date of Patent: Nov. 23, 2021

(54) BEVERAGE PREPARATION MACHINE WITH A CONTROLLED PUMP

(71) Applicant: NESTEC S.A., Vevey (CH)

(72) Inventors: Etienne Crozier, La Neuveville (CH); Bertrand Guyon, Saint Point Lac (FR); Marco Magatti, Lausanne (CH); Nicolas Obliger, Franey (FR); Jean-Luc Thuliez, Le Landeron (CH)

(73) Assignee: Societe des Produits Nestle S.A., Vevey (CH)

( * ) Notice: Subject to any disclaimer, the term of this patent is extended or adjusted under 35 U.S.C. 154(b) by 193 days.

(21) Appl. No.: 16/312,349

(22) PCT Filed: Jun. 16, 2017

(86) PCT No.: PCT/EP2017/064732
§ 371 (c)(1),
(2) Date: Dec. 21, 2018

(87) PCT Pub. No.: WO2018/001750
PCT Pub. Date: Jan. 4, 2018

(65) Prior Publication Data
US 2019/0223656 A1    Jul. 25, 2019

(30) Foreign Application Priority Data
Jun. 30, 2016   (EP) .................................. 16177217

(51) Int. Cl.
*A47J 31/46*    (2006.01)
*A47J 31/52*    (2006.01)
(Continued)

(52) U.S. Cl.
CPC ............. *A47J 31/468* (2018.08); *A47J 31/34* (2013.01); *A47J 31/525* (2018.08);
(Continued)

(58) Field of Classification Search
CPC .... A47J 31/468; A47J 31/525; A47J 31/5255; A47J 31/36; A47J 31/3623
(Continued)

(56) References Cited

U.S. PATENT DOCUMENTS 1,774,980 A * 9/1930 Lambert ................. A47J 31/36
99/303
5,392,694 A * 2/1995 Muller .................... A47J 31/36
99/295
(Continued)

FOREIGN PATENT DOCUMENTS

CN    101150974 A    3/2008
CN    102562553 A    7/2012
(Continued)

OTHER PUBLICATIONS

China Patent Office Communication for Application No. 201780036704.6, dated Apr. 16, 2021, 18 pages.
(Continued)

*Primary Examiner* — Reginald Alexander
(74) *Attorney, Agent, or Firm* — K&L Gates LLP

(57) ABSTRACT

A beverage preparation machine (1) comprises a source of liquid (2,3) and a dispensing outlet (4) connected via a pump (10) that includes a chamber (11) and a displaceable wall (12) delimiting the chamber (11). The pump (10) further has: an electric actuator (13) driving the displaceable wall (12) for causing an inflow of liquid from the source into the chamber (11) and for causing an outflow of liquid from the chamber (11) to the dispensing outlet (4); and a powering unit (14) that comprises an electric power source (142) and that is configured for supplying power to the actuator (13). The powering unit (14) further comprises: a sensor (143) for measuring an electrical parameter representative of a consumption of power by the actuator (13); and a control unit (144) that is connected to the sensor (143) and to the
(Continued)

electrical power source (142) and that is configured to control the power supplied to the actuator (13) by the electric power source (142) as a function of: the measured parameter; and a desired liquid input into the chamber (11) and/or liquid output from the chamber (11), such as a desired flow and/or pressure of the liquid input and/or of the liquid output.

19 Claims, 3 Drawing Sheets

(51) Int. Cl.
*A47J 31/34* (2006.01)
*A47J 31/36* (2006.01)

(52) U.S. Cl.
CPC ....... *A47J 31/5251* (2018.08); *A47J 31/5253* (2018.08); *A47J 31/5255* (2018.08); *A47J 31/3623* (2013.01)

(58) Field of Classification Search
USPC ................................................ 99/302 R, 305
See application file for complete search history.

(56) References Cited

U.S. PATENT DOCUMENTS

| | | | |
|---|---|---|---|
| 6,672,200 B2 * | 1/2004 | Duffy | A47J 31/0642 222/146.5 |
| 6,829,981 B2 * | 12/2004 | Lassota | A47J 31/06 99/299 |
| 6,832,542 B2 | 12/2004 | Hu et al. | |
| 7,028,603 B1 | 4/2006 | Gremillion et al. | |
| 2011/0212236 A1 | 9/2011 | Nguyen et al. | |
| 2013/0014647 A1 | 1/2013 | Mori et al. | |
| 2013/0061763 A1 * | 3/2013 | Piai | A47J 31/56 99/295 |
| 2013/0152797 A1 * | 6/2013 | Mori | A47J 31/446 99/280 |
| 2013/0298776 A1 * | 11/2013 | Mulder | A47J 31/5255 99/283 |
| 2015/0245733 A1 * | 9/2015 | Castellani | A47J 31/0673 426/112 |
| 2015/0327711 A1 * | 11/2015 | Bachmann | A47J 31/22 99/302 C |
| 2016/0084522 A1 | 3/2016 | Baumgart et al. | |
| 2016/0157665 A1 | 6/2016 | Majer et al. | |
| 2020/0008602 A1 | 1/2020 | Guyon et al. | |

FOREIGN PATENT DOCUMENTS

| | | |
|---|---|---|
| CN | 105476484 | 4/2016 |
| JP | 2008519587 A | 6/2008 |
| RU | 2013103709 | 8/2014 |
| WO | 2011077135 | 6/2011 |
| WO | 2013121438 | 8/2013 |
| WO | 2015086371 | 6/2015 |
| WO | 2016055231 A1 | 4/2016 |
| WO | 2016055232 | 4/2016 |

OTHER PUBLICATIONS

Japan Patent Office Communication for Application No. 2018-565743, Dispatch No. 577486, dated Jul. 6, 2021, 8 pages.

* cited by examiner

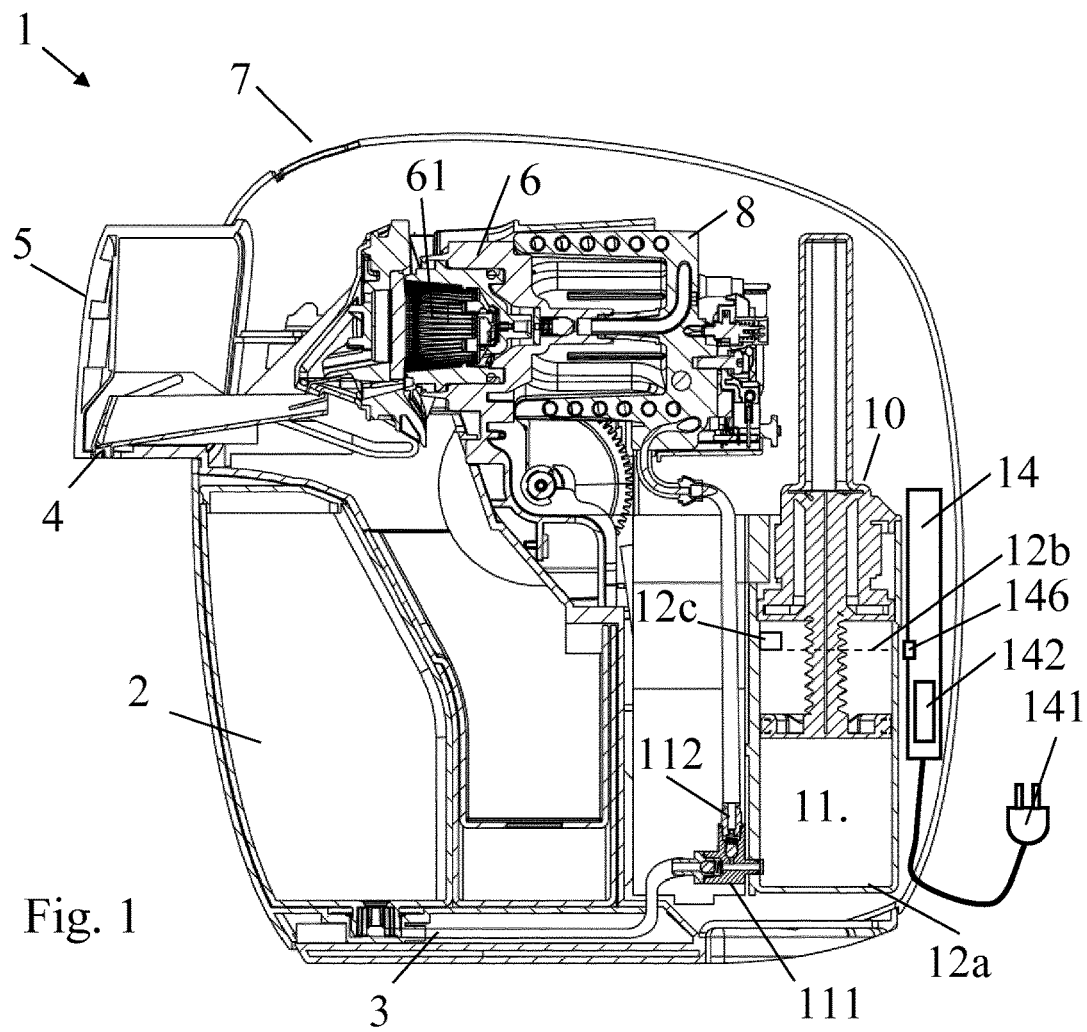
Fig. 1
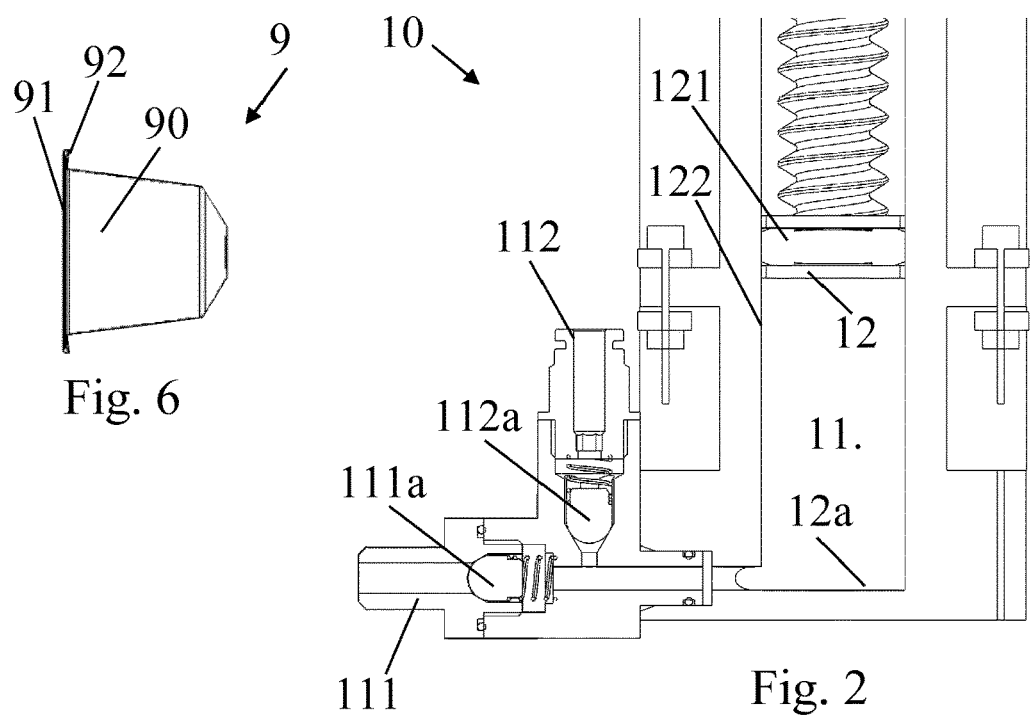
Fig. 6
Fig. 2

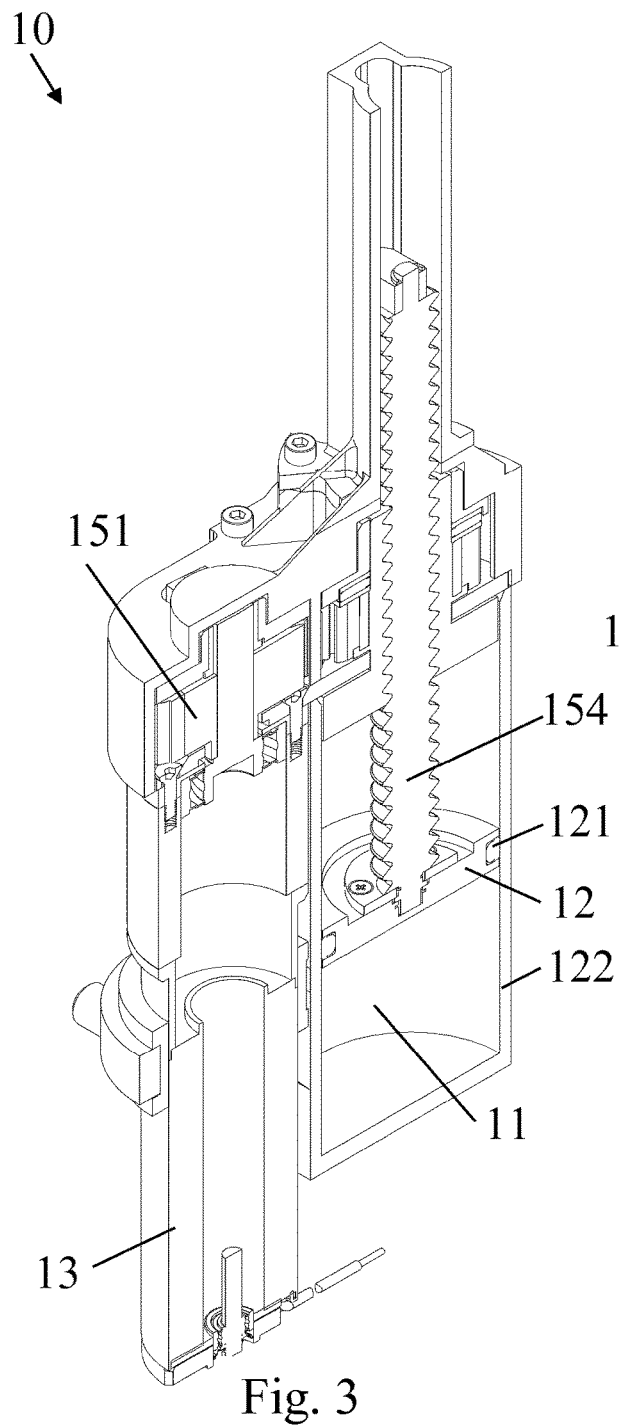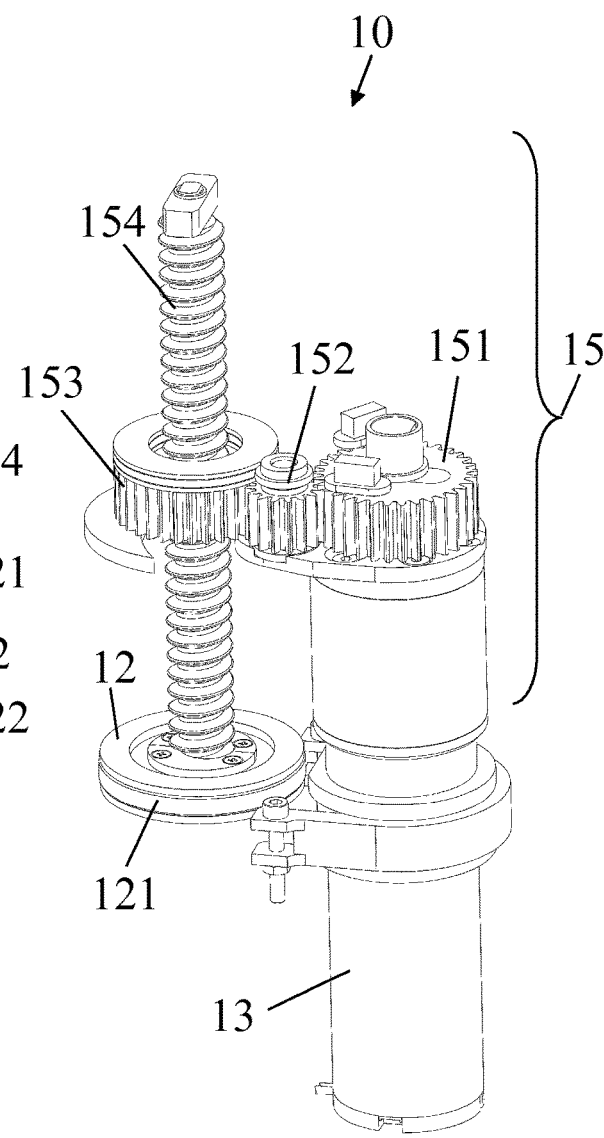
Fig. 3
Fig. 4

BEVERAGE PREPARATION MACHINE WITH A CONTROLLED PUMP

CROSS REFERENCE TO RELATED APPLICATIONS

The present application is a National Stage of International Application No. PCT/EP2017/064732, filed on Jun. 16, 2017, which claims priority to European Application No. 16177217.3, filed on Jun. 30, 2016, the entire contents of which are being incorporated herein by reference.

FIELD OF THE INVENTION

The present invention concerns beverage preparation machines with a controlled pump.

For the purpose of the present description, a "beverage" is meant to include any liquid food, such as tea, coffee, hot or cold chocolate, milk, soup, baby food, etc . . . A "capsule" is meant to include any pre-portioned beverage ingredient within an enclosing packaging of any material, in particular an airtight packaging, e.g.

plastic, aluminium, recyclable and/or biodegradable packagings, and of any shape and structure, including soft pods or rigid cartridges containing the ingredient.

BACKGROUND ART

Beverage preparation machines have been known for a number of years. For example, U.S. Pat. No. 5,943,472 discloses a water circulation system between a water reservoir and a hot water or vapour distribution chamber of an espresso machine. Suitable pumps for beverage machines are for instance disclosed in U.S. Pat. No. 2,715,868, 5,392,694, 5,992,298, 6,554,588, WO 2004/014205, WO 2005/053489, WO 2006/005425, WO 2006/032599, WO 2009/150030 and WO 2010/108700. EP 2 247 857, EP 2 643 588 and EP 2 904 266 disclose a pump with a pump chamber that is associated with a heater for heating liquid in the pump chamber. WO 2004/014205 and WO 2005/053489 teach the use of a pressurized gas source for pressurizing and driving liquid in a beverage machine. WO 2006/005425 discloses the use of a peristaltic pump for driving a liquid in a beverage machine. U.S. Pat. No. 2,715,868 discloses a beverage preparation machine with a pump of the rotary type. U.S. Pat. No. 5,392,694 discloses an espresso machine with a pump that has a piston actuated by an eccentric drive via a connecting rod engaged.

SUMMARY OF THE INVENTION

A preferred object of the present invention concerns a beverage machine with a simple pump configuration adapted to provide a reliable pump performance control.

Therefore, the invention relates to a beverage preparation machine comprising a source of liquid and a dispensing outlet connected via a pump.

The pump has a chamber and a displaceable wall delimiting the chamber. The displaceable wall being for instance joined to the adjacent (typically static) chamber wall(s) by a seal, e.g. an O-ring. The pump further has an electric actuator driving the displaceable wall between a first position and a second position for causing an inflow of liquid from the source into the chamber and for causing an outflow of liquid from the chamber to the dispensing outlet optionally via a thermal conditioner such as a heater and/or cooler.

The pump also has a powering unit that comprises an electric power source and that is configured for supplying power to the actuator. The powering unit can have an electric plug or connector for connection to the mains or a different power supply, e.g. a battery or transformer (DC) and/or renewable energy supply (solar photovoltaic supply).

The powering unit includes a sensor for measuring at least one electrical parameter representative of a consumption of power by the actuator from the source. The powering unit further includes a control unit connected to the sensor and to the electrical power source. The control unit is configured to control the power supplied to the actuator by the electric power source as a function of: the at least one measured parameter; and a desired liquid input into the chamber and/or a desired liquid output from the chamber, such as a desired flow and/or pressure of the liquid input and/or of the liquid output.

Hence, a sensor of the electric consumption by the pump's actuator can be used to determine the performance of the pump and to adjust the powering of the pump accordingly.

The sensor can be at least one of an ammeter (e.g. a hall sensor), voltmeter and potentiometer.

The incorporation of a sensor for measuring at least one electrical parameter representative of a consumption of power by the pump's actuator can replace the use of a flowmeter or a pressure sensor for measuring the performance of the pump.

The control unit may control: a thermal conditioner, such as a heater and/or cooler; and/or the opening and closing of an ingredient unit and/or a gate leading thereto.

The control unit can be connected by wired or wireless connection to a machine's user-interface (i.e. a user-interface incorporated in the machine) or to a communication module for communicating with an external device (i.e. a remote device), e.g. a network and/or a portable device (e.g. smartphone).

The pump can have one, two or more cavities.

The pump's chamber may form a single cavity.

The pump's chamber can have a pump inlet in fluidic connection with the source of liquid and a pump outlet in fluidic connection with the dispensing outlet. The pump inlet may have an anti-return valve for preventing an outflow of liquid from the chamber via the inlet. The pump outlet can have an anti-return valve for preventing an inflow of liquid into the chamber via the outlet. Typically, such inlet and outlet extend into the same cavity.

The chamber may include an upstream cavity with a pump inlet and a downstream cavity with a pump outlet, the first and second cavity being connected via an anti-return valve in the displaceable wall located between downstream cavity and the upstream cavity, the anti-return valve permitting a flow of liquid from the upstream cavity to the downstream cavity and preventing an opposition flow. For instance, the pump is a solenoid pump of the type disclosed in WO 2009/150030.

The pump inlet may have a larger section than the pump outlet to allow a faster and/or easier refill of the chamber, irrespectively of the number of cavities it has.

The actuator may include a motor connected to the displaceable wall by a transmission. The transmission can include a gear arrangement, such as a spur-gear arrangement, e.g. an arrangement comprising one or more of a (toothed-)wheel, (toothed-)pinion, snail or archimedian screw, such as a toothed wheel connected via a toothed pinion to a further toothed wheel intermeshing with an archimedian screw secured to the displaceable wall. The transmission may incorporate at least one chain or belt, such as a toothed-belt.

The actuator may be formed by an electrically powered solenoid to produce a magnetic flux in the displaceable wall of the pump for moving the wall. For instance, the pump can be a solenoid pump.

The actuator may be a stator of the pump configured to drive a rotor forming the displaceable wall.

The control unit can be configured to control the electric power source to supply a desired voltage to the electric actuator, such as a constant or variable voltage e.g. an alternating voltage at a fixed or adjustable frequency and/or at a fixed or adjustable amplitude. The sensor can be being configured to measure as at least one parameter a current intake by the actuator at the desired voltage.

The control unit may be configured to control the power source to supply a desired current to the electric actuator, such as a constant or variable current e.g. an alternating current at a fixed or adjustable frequency and/or at a fixed or adjustable amplitude. The sensor can be configured to measure as at least one parameter a voltage intake by the actuator at the desired current.

The control unit may be configured to:
carry out a comparison, such as a comparison over time, of the at least one measured parameter and a predetermined reference stored in the control unit, such as a predetermined reference selected from: a factory stored reference; a predetermined reference stored by updating the control unit, e.g. a wired or wireless updating; and a predetermined reference provided ad hoc for a beverage serving, such as a predetermined reference associated with an ingredient of the beverage serving or with a user-input dedicated to the beverage serving; and
control the power supplied to the actuator as a function of the comparison.

The control unit may be configured to adjust a voltage intake by the actuator from the power supply to ensure a desired current intake by the actuator derived from measuring with the sensor the current intake as at least one parameter, e.g. to provide the liquid at a desired pressure from the chamber towards the dispensing outlet.

The control unit may be configured to adjust a current intake by the actuator from the power supply to ensure a desired voltage intake by the actuator derived from measuring with the sensor the voltage intake as at least one parameter, e.g. to provide the liquid at a desired flow rate from the chamber towards the dispensing outlet.

Such a configuration allows to change easily the pumping profile to match a desired profile, in terms of flow and/or pressure of the pumped liquid.

When the liquid is pumped through a flavouring ingredient, it may be convenient to adjust the flow/pressure profile to adjust the properties of the beverage resulting from combining the ingredient with the pumped liquid.

The flavouring of the liquid may be influenced in this manner.

The overall visual aspect of the resulting beverage may be influenced.

The texture of the resulting beverage may be influenced in this manner. For instance, when the beverage is coffee, crema quantity and colour may be influenced.

When the beverage is coffee, coffee extraction profiles can be obtained.

Hence, the resulting beverages produced from the same ingredients may differ in taste depending on the adjusted flow pressure profile.

Typically, it may be appropriate to allow ground coffee or tea leaves to be wetted by the pumped liquid in a static or slow flow initial phase and then, when the ground coffee or tea leaves are in a desired state for delivering their flavours, to increase the flow of liquid through the ingredient (thereby reducing the dispensing time).

Based on the measured parameter, the control unit may control the powering by the power source of the electric actuator to achieve a particular outflow of liquid from the pump, e.g. a particular speed, volume, flow and/or pressure.

The control of the powering may relate to the speed of the actuator, e.g. a speed of rotation of a motor as the actuator or the speed of displacement of a linear actuator.

The control of the powering may relate to the position of the actuator. The position of the displaceable wall may be derived therefrom and thus a volume of liquid that is moved into and/or out of the chamber by the displaceable wall.

The control unit can be configured to take a safety measure when the difference between the measured parameter and the predetermined reference exceeds a tolerance value, such as a value greater than 5% e.g.

greater than 10% for instance greater than 20% of the predetermined reference. For instance, the safety measure comprises interrupting the powering of the actuator and/or providing a corresponding indication on a user-interface.

The control unit can be configured to take a safety measure when the measured parameter increases or decreases at a rate that is greater in absolute value than a predetermined threshold value, such as a rate of increase of a current intake by the actuator that is greater than a current increase threshold value or a rate of decrease of a predetermined voltage intake that is greater in absolute value than a predetermined voltage decrease threshold value. Such increase or decrease rate can be permanently greater in absolute value than the predetermined threshold value for a minimum period of time, such as for more than 0.2 or 0.5 or 1.0 sec. Such measured parameter may reach a threshold value that defers from a predetermined reference by at least 10% such as at least 20% or that reaches a predetermined extremal value, such as 0 or a saturation value of the electric power source or a predetermined fraction of the saturation value or a predetermined absolute value.

Such safety measure can be used to address a malfunctioning or mechanical blockage of the pump.

The safety measure can be used to address a shortage of liquid from the source.

The safety measure can be used to indicate an inappropriate flow resistance downstream the pump. The flow resistance can be higher or lower than expected. For instance, when the pumped liquid is mixed with a flavouring ingredient, e.g. a solid ingredient such as ground coffee or tea leaves, such flavouring ingredient may produce a flow resistance. When the flavouring ingredient is identified, e.g. by automatic recognition, the measured flow resistance can be compared to the expected flow resistance for the identified ingredient and a safety measure can be used if the difference is deemed too important.

The safety measure can be used to address an interference in the machine's liquid circuit, e.g. a clogging between the pump and the outlet or between the liquid source and the pump or in the pump itself.

The control unit can be configured to interrupt the powering of the actuator when the displaceable wall delimiting the chamber reaches an end wall of the chamber or a physically-determined or sensor-determined end position, e.g. an end position determined by a magnetic, capacitive or optical sensor or an end position determined by a mechanical stop.

More generally, one or more position sensors can be used to sense the position of the displaceable wall displaced along the position sensor(s) to derive a volume of liquid that is moved into and/or out of the chamber by the wall. Magnetic, capacitive and/or optical sensor(s) can conveniently be used as such position sensor(s).

The pump can be configured to drive the liquid from the source towards the outlet via a unit arranged to receive a beverage ingredient, e.g. coffee or tea or cacao or milk, in an ingredient chamber. For instance, the ingredient is supplied within a capsule into the unit e.g. via a passage. Such passage can be associated with a gate. Thereby, the ingredient can be mixed with the liquid to form a beverage to be dispensed from the unit via the outlet. For example, an ingredient is supplied within capsule having a cup body and a lid extending beyond the body to form a peripheral flange.

The insertion into the ingredient chamber and/or removal therefrom of such a capsule is known per se. WO 2005/004683, WO 2009/043630, WO 2012/025258 and WO 2013/127476 provide examples of suitable capsule insertion and/or removal.

The control unit can be configured to: carry out a comparison, typically over time, of the at least one measured parameter and a predetermined reference associated with the ingredient; and control the power supplied to the actuator as a function of the comparison, such as control the power supplied to the actuator so as to minimise a difference between the predetermined reference and the at least one measure parameter.

For instance, the predetermined reference is derivable from a characteristic of the ingredient and/or of a capsule containing the ingredient or of a user-input associated with the ingredient.

A characteristic of the ingredient may be derived from a flow property of the ingredient in the unit's ingredient chamber. This flow property can be derived from the at least one electrical parameter representative of the consumption of power from the power source by the actuator measured by the sensor. Depending on the type of beverage, the ingredient (e.g. ground coffee, instant coffee, tea or milk concentrate or powder) used therefor may be more or less resistant to the flow or liquid through the ingredient.

A characteristic of the capsule can be measured when the capsule is in the unit's ingredient chamber or when the capsule is supplied to the unit's ingredient chamber e.g. at the level of the passage, e.g. as for example disclosed in WO2012123440, WO 2014/056641, WO 2014/056642 and WO 2015/086371.

The characteristic of the capsule that can be measured can be a mechanical electrical, magnetic and/or optical capsule characteristic. At least one of a capsule's colour, graphic pattern, shape, electric conductivity, capacitive conductivity, inductivity conductivity and magnetic conductivity, may be measured.

For instance, a used capsule can be a closed capsule and the or a characteristic that is measured is the opening force or pressure required, e.g. supplied by the liquid supplied by the pump. When the capsule contains an ingredient that provides a noticeable resistance against the flow of the liquid (e.g. compacted ground coffee), then such additional ingredient-caused resistance will be reflected in the measured characteristic.

The invention also relates to a use of a capsule containing an ingredient for being mixed in the ingredient chamber of the machine as described above with the liquid from the pump to prepare a beverage to be dispensed via the outlet.

Another aspect of the invention relates to a method for preparing and dispensing a beverage by operating the machine described above.

The beverage preparation machine may include one or more of the following components:
a) a brewing unit (as the beverage ingredient unit) for receiving an ingredient of this beverage, in particular a pre-portioned ingredient (e.g. coffee or tea) supplied within a capsule, and for guiding an incoming flow of liquid, such as water, through such ingredient to a beverage outlet;
b) one or more fluid connecting members for guiding this liquid from the source of liquid, such as a tank of liquid, to the beverage outlet; and
c) one or more electric sensors for sensing at least one operational characteristic selected from characteristics of the beverage ingredient unit (e.g. the above brewing unit), an in-line thermal conditioner, the pump, a liquid tank, an ingredient collector, a flow of this liquid, a pressure of this liquid and a temperature of this liquid, and for communicating such characteristic(s) to the control unit.

The thermal conditioner may be a heater of the type of a thermoblock or an on demand heater (ODH), for instance an ODH type disclosed in EP 1 253 844, EP 1 380 243 and EP 1 809 151.

The machine's components may be fully or essentially automatically assembled, as disclosed in WO 2009/130099.

BRIEF DESCRIPTION OF THE DRAWINGS

The invention will now be described with reference to the schematic drawings, wherein:

FIG. 1 shows an internal structure of a beverage preparation machine with a pump arranged according to the invention;

FIG. 2 is an enlarged cross-sectional view of the pump's fluid inlet, outlet and chamber of the machine's pump of FIG. 1;

FIG. 3 is a perspective cross-sectional view of the machine's pump of FIG. 1;

FIG. 4 is a perspective view of the actuator and transmission of the machine's pump of FIG. 1; FIG. 6 is an enlarged side view of an ingredient capsule for being extracted by the machine of FIG. 1.

DETAILED DESCRIPTION

Figure 5:
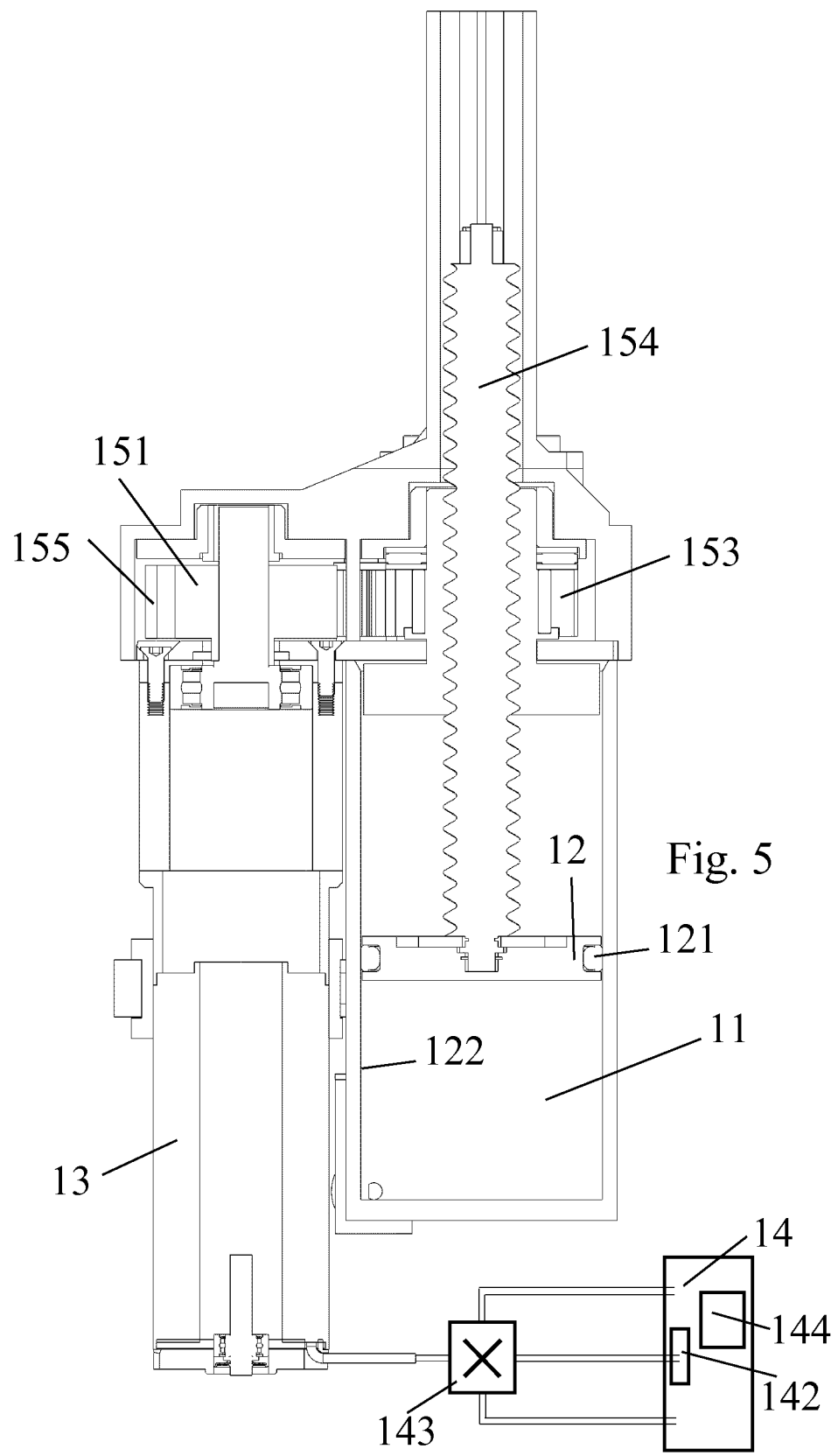
FIG. 5 is a cross-sectional view of the pump of FIG. 1, the electric connection of the pump to an electric power source associated with a sensor for measuring at least one electrical parameter representative of a consumption of power from the source by the actuator being schematically illustrated.

FIGS. 1 to 6 illustrate an exemplary embodiment of a beverage preparation machine 1 with a source of liquid 2,3, such as water, and a dispensing outlet 4 connected via a pump 10. Source of liquid may have a liquid tank 2 and a connection line 3 for connecting tank 2 to pump 10.

Pump 10 includes a chamber 11 and a displaceable wall 12 delimiting chamber 11. Displaceable wall 12 being for instance joined to adjacent (typically static) chamber wall(s) 122 by a seal 121, e.g. an O-ring or lip seal.

Pump 10 further has an electric actuator 13 driving displaceable wall 12 between a first position and a second position for causing an inflow of liquid from source 2,3 into the chamber 11 and for causing an outflow of liquid from chamber 11 to dispensing outlet 4. For instance, such liquid is passed by pump 10 through a thermal conditioner 8, such as a heater and/or cooler.

Pump 10 includes a powering unit 14 that has an electric power source 142 and that is configured for supplying power to actuator 13. Powering unit 14 can be connected by an electric plug or connector 141 to the mains or a different power supply, e.g. a battery or transformer (DC) and/or renewable energy supply (solar photovoltaic supply).

Powering unit 14 has a sensor 143 for measuring at least one electrical parameter representative of a consumption by actuator 13 of power from power source 142.

Powering unit 14 includes a control unit 144 connected to sensor 143 and to power source 142. Control unit 144 is configured to control the power supplied to actuator 13 by power source 142 as a function of: the at least one measured parameter; and a desired liquid input into chamber 11 and/or a desired liquid output from chamber 11, such as a desired flow and/or pressure of the liquid input and/or of the liquid output.

Control unit 144 may control a thermal conditioner 8, such as a heater and/or cooler.

Control unit 144 can control the opening and closing of an ingredient unit 6 and/or a gate 7 leading thereto.

Control unit 144 can be connected by wired or wireless connection to a user-interface 5 or to a communication module for communicating with an external device, e.g. a network and/or a portable device (e.g. a smartphone).

Chamber 11 can have a pump inlet 111 in fluidic connection with source of liquid 2,3 and a pump outlet 112 in fluidic connection with dispensing outlet 4. Such pump inlet 111 may have an anti-return valve 111a for preventing an outflow of liquid from the chamber 11 via inlet 111. Pump outlet 112 may have an anti-return valve 112a for preventing an inflow of liquid into chamber 11 via outlet 112. Typically, chamber 11 forms a single cavity into which such inlet 111 and outlet 112 extend.

The chamber can include an upstream cavity with a pump inlet and a downstream cavity with a pump outlet, the first and second cavity being connected via an anti-return valve in the displaceable wall located between downstream cavity and the upstream cavity, the anti-return valve permitting a flow of liquid from the upstream cavity to the downstream cavity and preventing an opposition flow. For instance, the pump is a solenoid pump of the type disclosed in WO 2009/150030.

The actuator typically comprises a motor 13 connected to displaceable wall 12 by a transmission 15.

In the case of a solenoid pump, the actuator may be formed by an electrically powered solenoid that drives magnetically a piston to reciprocate in the pump.

Transmission 15 associated with motor 13 may include a gear arrangement, such as a spur-gear arrangement, e.g.

an arrangement comprising one or more of a (toothed-) wheel 151, (toothed-)pinion 152, snail or archimedian screw 154, such as a toothed wheel 151 connected via a toothed pinion 152 to a further toothed wheel 153 intermeshing with an archimedian screw 154 secured to displaceable wall 12. An example of such an embodiment is illustrated in FIG. 4. For example, a sufficient play is provided between archimedian screw 154 and displaceable wall 12 to compensate for manufacturing and assembly tolerances, e.g. to avoid or minimise constraints resulting from off-axis rotation of the archimedian screw). For instance, wall 12 is mounted freely on archimedian screw 154.

Transmission 15 may include at least one chain or belt, such as a toothed-belt 155. An example of such an embodiment is illustrated in FIG. 5 which, in this respect, shows a variation of the embodiment of FIG. 4.

Control unit 144 can be configured to control electric power source 142 to supply a desired voltage to electric actuator 13, such as a constant or variable voltage, e.g. an alternating voltage at a fixed or adjustable frequency and/or at a fixed or adjustable amplitude. Sensor 143 may be configured to measure as at least one parameter a current intake by actuator 13 at the desired voltage.

Control unit 144 can be configured to control electric power source 142 to supply a desired current to electric actuator 13, such as a constant or variable current e.g. an alternating current at a fixed or adjustable frequency and/or at a fixed or adjustable amplitude. Sensor 143 may be configured to measure as at least one parameter a voltage intake by actuator 13 at the desired current.

Control unit 144 can be configured to:
carry out a comparison, such as a comparison over time, of the at least one measured parameter and a predetermined reference stored in the control unit, such as a predetermined reference selected from: a factory stored reference; a predetermined reference stored by updating control unit 144, e.g. a wired or wireless updating; and a predetermined reference provided ad hoc for a beverage serving, such as a predetermined reference associated with an ingredient of the beverage serving or with a user-input dedicated to the beverage serving; and
control the power supplied to actuator 13 as a function of the comparison.

Control unit 144 may be configured to adjust a voltage intake by actuator 13 from power supply 142 to ensure a desired current intake by actuator 13 derived from measuring with sensor 143 the current intake as at least one parameter, e.g. to provide the liquid at a desired pressure from chamber 11 towards dispensing outlet 4.

Control unit 144 can be configured to adjust a current intake by the actuator 13 from power supply 142 to ensure a desired voltage intake by actuator 13 derived from measuring with sensor 143 the voltage intake as at least one parameter, e.g. to provide the liquid at a desired flow rate (ml/min.) from chamber 11 towards outlet 4.

Control unit 144 may be configured to take a safety measure when the difference between the measured parameter and the predetermined reference exceeds a tolerance value, such as a value greater than 5% e.g. greater than 10% for instance greater than 20% of the predetermined reference, optionally the safety measure comprising interrupting the powering of actuator 13 and/or providing a corresponding indication on a user-interface 5.

Control unit 144 can be configured to take a safety measure when the measured parameter increases or decreases at a rate that is greater in absolute value than a predetermined threshold value, such as a rate of increase of a current intake by actuator 13 that is greater than a current increase threshold value or a rate of decrease of a predetermined voltage intake that is greater in absolute value than a predetermined voltage decrease threshold value. The increase or decrease rate can be permanently greater in absolute value than the predetermined threshold value for a minimum period of time, such as for more than 0.2 or 0.5 or 1.0 sec. The measured parameter may reach a threshold value that defers from a predetermined reference by at least 10% such as at least 20% or that reaches a predetermined extremal value, such as 0 or a saturation value of power source 142 or a predetermined fraction of the saturation value or a predetermined absolute value.

Control unit 144 may be configured to interrupt the powering of actuator 13 when displaceable wall 12 delimiting chamber 11 reaches an end wall 12a of chamber or a physically-determined or sensor-determined end position 12b, e.g. an end position determined by a magnetic or optical sensor 146 or an end position determined by a mechanical stop 12c. See FIGS. 1 and 2.

Pump 10 can be configured to drive liquid from source 2,3 towards outlet 4 via a unit 6 arranged to receive a beverage ingredient, e.g. coffee or tea or cacao or milk, in an ingredient chamber 61. The ingredient can be supplied within a capsule 9 into unit 6 e.g. via a passage 7, such as a passage associated with a gate. See FIGS. 1 and 6. Thereby, the ingredient can be mixed with the liquid to form a beverage to be dispensed from the unit 6 via outlet 4. The ingredient can be supplied within capsule 9 having a cup body 90 and a lid 91 extending beyond body 90 to form a peripheral flange 92. See FIG. 6.

Control unit 44 can be configured to: carry out a comparison, such as a comparison over time, of the at least one measured parameter and a predetermined reference associated with the ingredient; and control the power supplied to actuator 13 as a function of the comparison. For instance, control unit 44 controls the power supplied to actuator 13 so as to minimise a difference between the predetermined reference and the at least one measure parameter.

The predetermined reference can be derivable from a characteristic of the ingredient and/or of a capsule 9 containing the ingredient or of a user-input associated with the ingredient.

A characteristic of the ingredient may be derived from a flow property of the ingredient in the unit's 6 chamber 61. This flow property can be derived from the at least one electrical parameter representative of the consumption of power from source 142 by actuator 13 measured by sensor 143. Depending on the type of beverage, the ingredient (e.g. ground and/or instant coffee, tea or milk concentrate or powder) used therefor may be more or less resistant to the flow of liquid therethrough.

A characteristic of capsule 9 can be measured when capsule 9 is in the unit's 6 ingredient chamber 61, e.g. as for example disclosed in WO 2011/000723, WO 2011/000725 and WO 2012/000878. A characteristic of capsule 9 may be measured when capsule 9 is in the unit's 6 ingredient chamber 61 or when capsule 9 is supplied to the unit's 6 ingredient chamber 61 e.g. at the level of passage 7, e.g. as for example disclosed in WO2012123440, WO 2014/056641, WO 2014/056642 and WO 2015/086371.

The characteristic of capsule 9 that can be measured can be a mechanical, electrical, magnetic and/or optical capsule nature. At least one of a capsule's colour, graphic pattern, shape, electric conductivity, capacitive conductivity, inductivity conductivity and magnetic conductivity, may be measured. For instance, capsule 9 is a closed capsule, and the or a characteristic that is measured is the opening force or pressure required, e.g.

supplied by the liquid supplied by pump 10. When the capsule contains an ingredient that provides a noticeable resistance against the flow of the liquid (e.g. compacted coffee), then such additional ingredient-caused resistance will be reflected in the measured characteristic.

The invention claimed is:
1. A beverage preparation machine comprising a source of a liquid and a dispensing outlet connected via a pump, the pump comprising:
   a chamber;
   a displaceable wall defining the chamber;
   an electric actuator driving the displaceable wall between a first position and a second position for causing an inflow of liquid from the source into the chamber and for causing an outflow of liquid from the chamber to the dispensing outlet; and
   a powering unit that comprises an electric power source and that is configured for supplying power to the electric actuator,
   the powering unit further comprises:
      a sensor configured to measure at least one electrical parameter representative of a consumption of power by the electric actuator from the electric power source; and
      a control unit connected to the sensor and to the electrical power source, the control unit being configured to control the power supplied to the electric actuator by the electric power source to achieve a desired speed, volume, flow, and/or pressure during pumping as a function of:
         the at least one electrical parameter; and
         a desired liquid input into the chamber and/or a desired liquid output from the chamber.

2. The beverage preparation machine of claim 1, wherein the chamber has a pump inlet in fluidic connection with the source of the liquid and a pump outlet in fluidic connection with the dispensing outlet, the pump inlet having an anti-return valve for preventing an outflow of the liquid from the chamber via the inlet, the pump outlet having an anti-return valve for preventing an inflow of the liquid into the chamber via the outlet.

3. The beverage preparation machine of claim 1, wherein the electric actuator comprises a motor connected to the displaceable wall by a transmission.

4. The beverage preparation machine of claim 3, wherein the transmission comprises a gear arrangement.

5. The beverage preparation machine of claim 3, wherein the transmission comprises at least one chain or belt.

6. The beverage preparation machine of claim 1, wherein the control unit is configured to control the electric power source to supply a desired voltage to the electric actuator.

7. The beverage preparation machine of claim 1, wherein the control unit is configured to control the electric power source to supply a desired current to the electric actuator.

8. The beverage preparation machine of claim 1, wherein the control unit is configured to:
   perform a comparison of the at least one electrical parameter and a predetermined reference stored in the control unit; and
   control the power supplied to the electric actuator as a function of the comparison.

9. The beverage preparation machine of claim 1, wherein the control unit is configured to interrupt the powering of the electric actuator when the displaceable wall defining the chamber reaches an end wall of the chamber or a physically-determined or sensor-determined end position.

10. The beverage preparation machine of claim 1, wherein the pump is configured to drive the liquid from the source towards the outlet via a unit arranged to receive a beverage ingredient.

11. The beverage preparation machine of claim 10, wherein the control unit is configured to:
   perform a comparison of the at least one electrical parameter and a predetermined reference associated with the ingredient; and
   control the power supplied to the electric actuator as a function of the comparison.

12. The beverage preparation machine of claim 1, wherein the sensor is selected from the group consisting of an ammeter, a voltmeter and a potentiometer.

13. The beverage preparation machine of claim 8, wherein the predetermined reference is selected from the group consisting of a factory stored reference; a predetermined reference stored by updating the control unit; and a predetermined reference provided ad hoc for a beverage serving.

14. A beverage preparation machine comprising a source of a liquid and a dispensing outlet connected via a pump, the pump comprising:
  a chamber;
  a displaceable wall defining the chamber;
  an electric actuator driving the displaceable wall between a first position and a second position for causing an inflow of liquid from the source into the chamber and for causing an outflow of liquid from the chamber to the dispensing outlet; and
  a powering unit that comprises an electric power source and is configured for supplying power to the electric actuator,
  the powering unit further comprises:
    a sensor configured to measure at least one electrical parameter representative of a consumption of power by the electric actuator from the electric power source; and
    a control unit connected to the sensor and to the electrical power source, the control unit being configured to control the power supplied to the electric actuator by the electric power source as a function of:
      the at least one electrical parameter; and
      a desired liquid input into the chamber and/or a desired liquid output from the chamber,
  wherein the chamber comprises an upstream cavity with a pump inlet and a downstream cavity with a pump outlet, the upstream and downstream cavities being connected via an anti-return valve in the displaceable wall located between the downstream cavity and the upstream cavity, the anti-return valve permitting a flow of the liquid from the upstream cavity to the downstream cavity and preventing an opposition flow.

15. A beverage preparation machine comprising a source of a liquid and a dispensing outlet connected via a pump, the pump comprising:
  a chamber;
  a displaceable wall defining the chamber;
  an electric actuator driving the displaceable wall between a first position and a second position for causing an inflow of liquid from the source into the chamber and for causing an outflow of liquid from the chamber to the dispensing outlet; and
  a powering unit that comprises an electric power source and is configured for supplying power to the electric actuator,
  the powering unit further comprises:
    a sensor configured to measure at least one electrical parameter representative of a consumption of power by the electric actuator from the electric power source; and
    a control unit connected to the sensor and to the electrical power source, the control unit being configured to control the power supplied to the electric actuator by the electric power source as a function of:
      the at least one electrical parameter; and
      a desired liquid input into the chamber and/or a desired liquid output from the chamber,
  wherein the control unit is configured to:
    perform a comparison of the at least one electrical parameter and a predetermined reference stored in the control unit; and
    control the power supplied to the electric actuator as a function of the comparison,
  wherein the control unit is further configured to adjust:
    a voltage intake by the electric actuator from the power supply to ensure a desired current intake by the electric actuator derived from measuring with the sensor; and/or
    a current intake by the electric actuator from the power supply to ensure a desired voltage intake by the electric actuator derived from measuring with the sensor, the voltage intake as the at least one electrical parameter.

16. A beverage preparation machine comprising a source of a liquid and a dispensing outlet connected via a pump, the pump comprising:
  a chamber;
  a displaceable wall defining the chamber;
  an electric actuator driving the displaceable wall between a first position and a second position for causing an inflow of liquid from the source into the chamber and for causing an outflow of liquid from the chamber to the dispensing outlet; and
  a powering unit that comprises an electric power source and that is configured for supplying power to the electric actuator,
  the powering unit further comprises:
    a sensor configured to measure at least one electrical parameter representative of a consumption of power by the electric actuator from the electric power source; and
    a control unit connected to the sensor and to the electrical power source, the control unit being configured to control the power supplied to the electric actuator by the electric power source as a function of:
      the at least one electrical parameter; and
      a desired liquid input into the chamber and/or a desired liquid output from the chamber,
  wherein the control unit is configured to:
    perform a comparison of the at least one electrical parameter and a predetermined reference stored in the control unit; and
    control the power supplied to the electric actuator as a function of the comparison,
  wherein the control unit is configured to take a safety measure when:
    the difference between the at least one electrical parameter and the predetermined reference exceeds a tolerance value; and/or
    the at least one electrical parameter increases or decreases at a rate that is greater in absolute value than a predetermined threshold value.

17. The beverage preparation machine of claim 16, wherein the tolerance value is 5%.

18. The beverage preparation machine of claim 16, wherein the predetermined threshold value defers from the predetermined reference by at least 10%.

19. The beverage preparation machine of claim 16, wherein the predetermined threshold value is selected from the group consisting of 0, a saturation value of the electrical power source, a predetermined fraction of the saturation value of the electrical power source, and a predetermined absolute value.

\* \* \* \* \*